(12) United States Patent
Smith et al.

(10) Patent No.: US 8,102,142 B2
(45) Date of Patent: Jan. 24, 2012

(54) DOUBLE ENDED INVERTER SYSTEM FOR A VEHICLE HAVING TWO ENERGY SOURCES THAT EXHIBIT DIFFERENT OPERATING CHARACTERISTICS

(75) Inventors: Gregory S. Smith, Woodland Hills, CA (US); Brian A. Welchko, Torrance, CA (US); George John, Cerritos, CA (US); Sibaprasad Chakrabarti, Torrance, CA (US); Milun Perisic, Torrance, CA (US); James M. Nagashima, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 614 days.

(21) Appl. No.: 12/110,950

(22) Filed: Apr. 28, 2008

(65) Prior Publication Data
US 2009/0033252 A1 Feb. 5, 2009

Related U.S. Application Data

(60) Provisional application No. 60/952,754, filed on Jul. 30, 2007.

(51) Int. Cl.
*H02P 27/04* (2006.01)
(52) U.S. Cl. ........ 318/801; 318/139; 318/105; 318/808; 318/400.27; 318/400.26; 363/71; 363/98; 180/65.1; 180/65.21
(58) Field of Classification Search .................. 318/801, 318/139, 105, 808, 400.26, 400.27; 363/71; 363/98; 180/65.1, 65.21
See application file for complete search history.

(56) References Cited

U.S. PATENT DOCUMENTS

| | | | |
|---|---|---|---|
| 5,389,749 A | 2/1995 | Hokari et al. | |
| 7,130,205 B2 | 10/2006 | Peng | |
| 7,154,237 B2 | 12/2006 | Welchko et al. | |
| 7,199,535 B2 | 4/2007 | Welchko et al. | |

FOREIGN PATENT DOCUMENTS

CN 1819419 A 8/2006

OTHER PUBLICATIONS

Linden, D; Reddy, T.B.; Handbook of Batteries, copyright 2002, McGraw Hill, 3$^{rd}$ Edition, Chapter 37 http://www.knovel.com/web/portal/basic_search/display?_EXT_KNOVEL_DISPLAY_bookid=627.*

(Continued)

*Primary Examiner* — Walter Benson
*Assistant Examiner* — Erick Glass
(74) *Attorney, Agent, or Firm* — Ingrassia Fisher & Lorenz, P.C.

(57) ABSTRACT

A double ended inverter system for an AC electric traction motor of a vehicle is disclosed. The inverter system serves as an interface between two different energy sources having different operating characteristics. The inverter system includes a first energy source having first operating characteristics associated therewith, and a first inverter subsystem coupled to the first energy source and configured to drive the AC electric traction motor. The inverter system also includes a second energy source having second operating characteristics associated therewith, wherein the first operating characteristics and the second operating characteristics are different, and a second inverter subsystem coupled to the second energy source and configured to drive the AC electric traction motor. In addition, the inverter system has a controller coupled to the first inverter subsystem and to the second inverter subsystem. The controller is configured to influence operation of the first inverter subsystem and the second inverter subsystem to manage power transfer among the first energy source, the second energy source, and the AC electric traction motor.

17 Claims, 3 Drawing Sheets

OTHER PUBLICATIONS

Singh, G.K., "Multi-Phase Induction Machine Drive Research—A Survey," Elsevier Science B.V., Electric Power Systems Research, 2002, pp. 139-147.

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Chinese Office Action for Chinese Application No. 200810173706.2 mailed Jan. 10, 2011.

* cited by examiner

DOUBLE ENDED INVERTER SYSTEM FOR A VEHICLE HAVING TWO ENERGY SOURCES THAT EXHIBIT DIFFERENT OPERATING CHARACTERISTICS

CROSS-REFERENCE TO RELATED APPLICATION(S)

This application claims the benefit of U.S. provisional patent application Ser. No. 60/952,754, filed Jul. 30, 2007 (the entire content of which is incorporated by reference herein).

TECHNICAL FIELD

Embodiments of the subject matter described herein relate generally to an electric traction system. More particularly, embodiments of the subject matter relate to methods and apparatus for utilizing multiple energy sources for the electric traction system, where the energy sources have different operating characteristics.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Batteries are typically used to provide electric power storage in most electric and hybrid electric vehicles. Battery technology is known and its deficiencies are well understood. One practical deficiency is that a given type of battery may only be suitable for certain operating conditions. For example, some batteries are suitable for operation at low temperatures and unsuitable for operation at high temperatures, while others are suitable for operation at high temperatures and unsuitable for operation at low temperatures. Thus, it is a technological challenge to have a single battery that performs well at very low temperatures and at relatively high temperatures that are usually associated with the operation of electric and hybrid electric vehicles.

As another example, some batteries perform best when delivering quick bursts of high power, while other batteries perform best when delivering lower power over a longer period of time. In this regard, lithium ion batteries are sufficient for high energy applications that require continuous power over a period of time, but they have difficulty providing bursts of power over a short time period. Thus, in an electric or hybrid vehicle application, lithium ion batteries can adequately provide power once the vehicle is cruising, but they struggle to deliver power for short duration events such as acceleration, and cold starting. On the other hand, as an alternative to lithium ion batteries, nickel metal hydride (NiMH) and lead acid batteries have been explored for hybrid electric vehicles. While these batteries can provide enough power to handle peak loads, using them in this manner lessens their cycle life dramatically. Thus, it is also a technological challenge to have a single battery that demonstrates both energy and power characteristics for electric and hybrid electric vehicle applications.

BRIEF SUMMARY

A double ended inverter system is provided for an AC electric traction motor of a vehicle. The double ended inverter system includes a first energy source having first operating characteristics associated therewith, and a second energy source having second operating characteristics associated therewith, wherein the first operating characteristics and the second operating characteristics are different. The system also includes a first inverter subsystem coupled to the first energy source, and a second inverter subsystem coupled to the second energy source. The two inverter subsystems are configured to drive the AC electric traction motor. The system also includes a controller coupled to the first inverter subsystem and to the second inverter subsystem. The controller is configured to influence operation of the first inverter subsystem and the second inverter subsystem to manage power transfer among the first energy source, the second energy source, and the AC electric traction motor.

A double ended inverter system for a vehicle is also provided. The double ended inverter system includes: an AC electric traction motor having a set of windings, where each winding in the set of windings has a first end and a second end; a low temperature energy source having a relatively low nominal operating temperature range; a first inverter subsystem coupled to the low temperature energy source and configured to drive the AC electric traction motor, wherein the first end of each winding in the set of windings is coupled to the first inverter subsystem; a high temperature energy source having a relatively high nominal operating temperature range; and a second inverter subsystem coupled to the high temperature energy source and configured to drive the AC electric traction motor, wherein the second end of each winding in the set of windings is coupled to the second inverter subsystem.

Another embodiment of a double ended inverter system for a vehicle is also provided. This system includes an AC electric traction motor having a set of windings, where each winding in the set of windings has a first end and a second end. The system also includes a power battery subsystem having a relatively high voltage and a relatively low amp-hours rating, and an energy battery subsystem having a relatively medium-to-high voltage and a relatively high amp-hours rating. The system employs a first inverter subsystem coupled to the power battery subsystem and configured to drive the AC electric traction motor, wherein the first end of each winding in the set of windings is coupled to the first inverter subsystem, and employs a second inverter subsystem coupled to the energy battery subsystem and configured to drive the AC electric traction motor, wherein the second end of each winding in the set of windings is coupled to the second inverter subsystem.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. For the sake of brevity, conventional techniques related to inverters, AC motor control, electric and hybrid electric vehicle operation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

Figure 1:
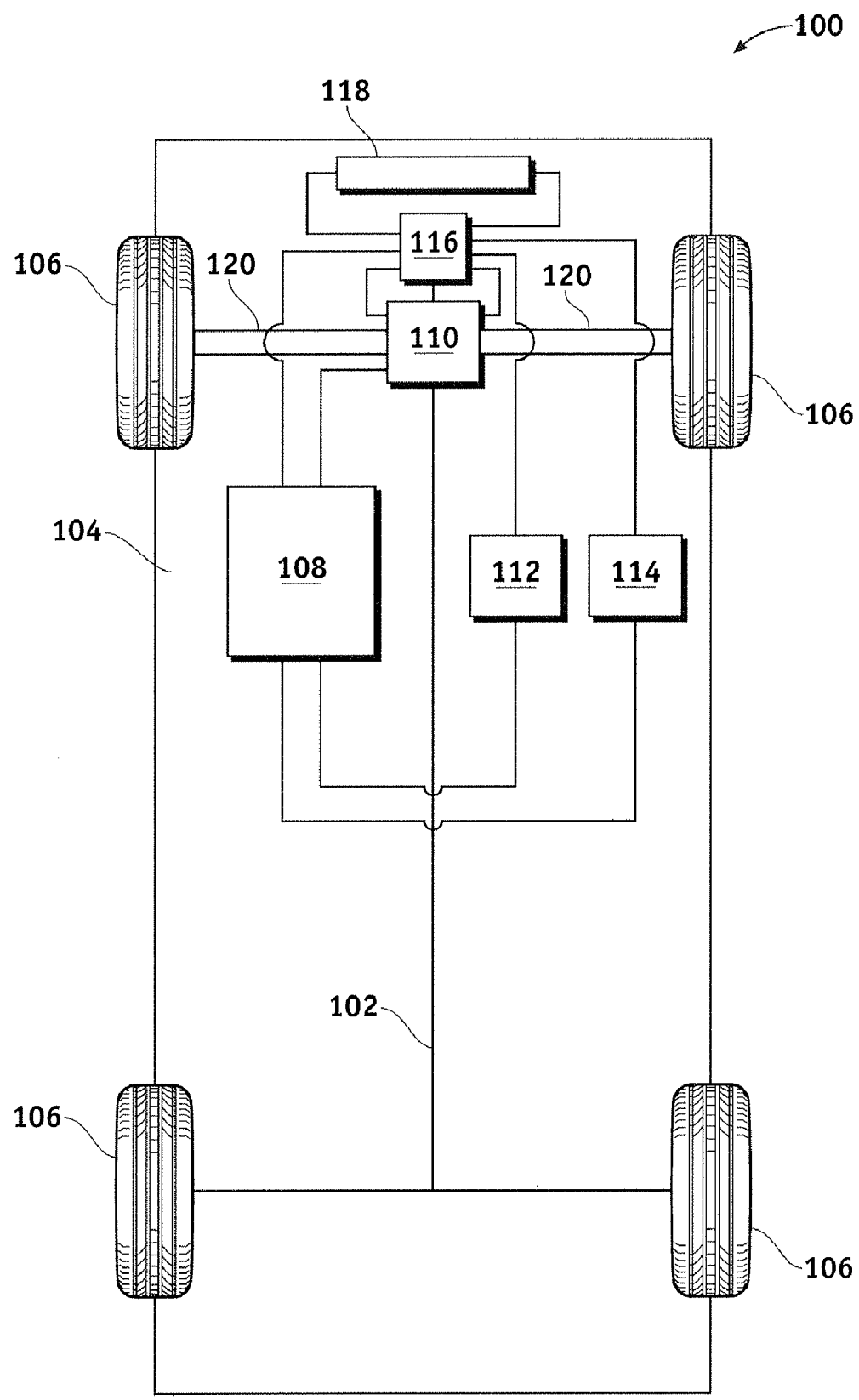
FIG. 1 is a schematic representation of an exemplary vehicle that incorporates an embodiment of a double ended inverter system.
Figure 2:
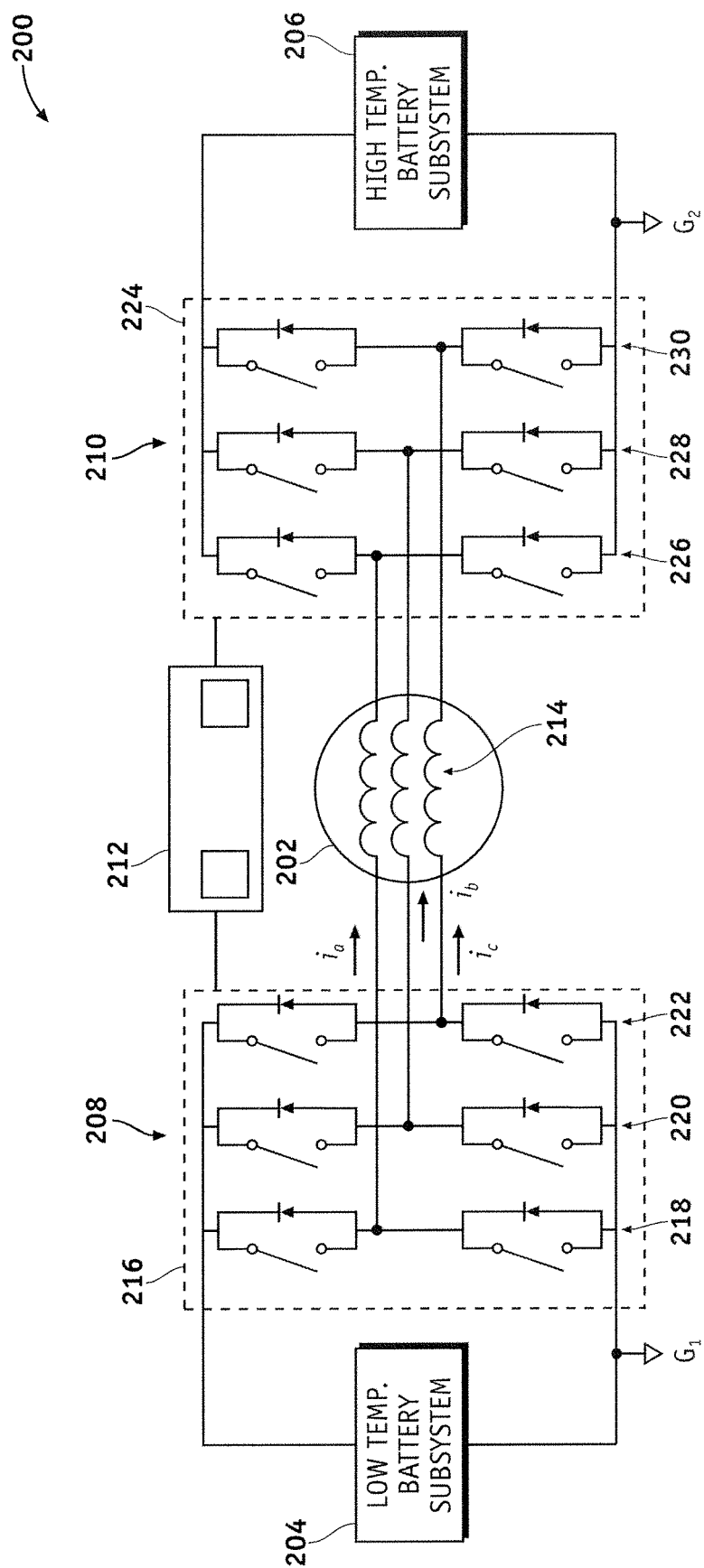
FIG. 2 is a schematic circuit representation of a first embodiment of a double ended inverter system suitable for use with an electric or hybrid electric vehicle.
Figure 3:
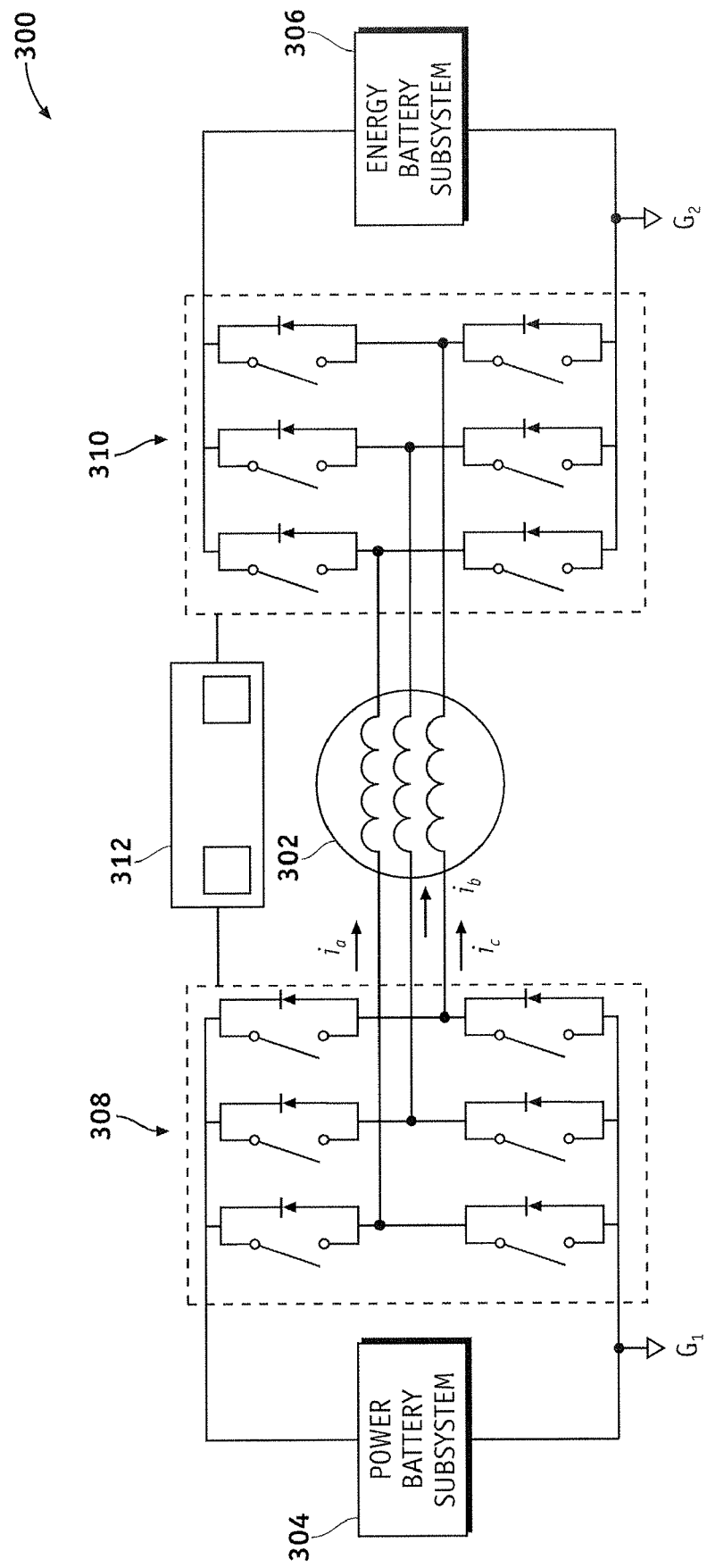
FIG. 3 is a schematic circuit representation of a second embodiment of a double ended inverter system suitable for use with an electric or hybrid electric vehicle.

With reference to FIGS. 1-3, an exemplary embodiment, which is a doubled ended inverter, permits a single electric motor to be driven from two different power sources. This can be useful when there are two power sources with different operating characteristics, ratings, optimized operating condition ranges, temperature ranges, or the like. One example would be a lithium ion battery pack with a limited temperature range that requires the battery pack to be cabin mounted in the vehicle. Using the double ended inverter with an additional wider temperature range power source permits operation beyond the limits of the lithium ion battery pack, especially during cold or hot starts where the battery pack has been thermally soaked for a long time and cabin heating/cooling has not moved the temperature of the battery pack into its normal operating range.

Thus, the double ended inverter can be used to combine two batteries with different operating temperature ranges. For example, a lithium ion battery pack with a relatively high nominal operating temperature range of −20° C. to +80° C. can be used with a lead acid battery with a relatively low nominal operating temperature range of −40° C. to +95° C. During cold starts below −20° C. the lead acid battery can operate the motor until the lithium ion battery warms up. In alternate embodiments, the double ended inverter system could be utilized with other energy storage devices having different operating temperature ranges, such as different types of ultra capacitors.

By combining a wider temperature range battery with a limited temperature range battery, the overall operating temperature range of the system can be extended. The double ended inverter is a very good way to combine two power sources at low cost and also provide battery charging and state of charge (SOC) regulation at no additional cost.

In accordance with another exemplary embodiment, a double ended inverter is configured to permit a single electric motor to be driven from two different power sources having different energy discharge/charge characteristics. This can be useful when it is desirable to employ two different batteries rather than compromising performance with a single battery. Thus, an energy battery can be coupled with a power battery through the double ended inverter topology.

For example, a lithium ion battery can handle continuous load requirements (which occur when the vehicle is cruising at a somewhat steady speed). Using a double ended inverter with a lead acid battery as the secondary power source will deliver power for short duration peak power events like acceleration. This will significantly reduce or eliminate the need for a single battery with combined energy and power characteristics.

This embodiment has numerous benefits. For example, it combines two types of batteries, manages both battery packs, significantly reduces or eliminates the need for a single battery with combined energy and power characteristics, and allows for use of existing battery technologies.

Referring more specifically to FIG. 1, a schematic representation of an exemplary vehicle 100 is depicted. Vehicle 100 preferably incorporates an embodiment of a double ended inverter system as described in more detail below. The vehicle 100 generally includes a chassis 102, a body 104, four wheels 106, and an electronic control system 108. The body 104 is arranged on chassis 102 and substantially encloses the other components of vehicle 100. The body 104 and chassis 102 may jointly form a frame. The wheels 106 are each rotationally coupled to chassis 102 near a respective corner of body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines and/or traction systems, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, vehicle 100 is a fully electric or a hybrid electric vehicle, and vehicle 100 further includes an electric motor (or traction motor) 110, a first energy source 112 having first operating characteristics associated therewith, a second energy source 114 having second operating characteristics associated therewith, a double ended inverter system 116, and a radiator 118. For the embodiments described here, first energy source 112 and second energy source 114 are batteries of different type, class, category, rating, etc. Indeed, double ended inverter system 116 is suitably configured such that the first operating characteristics of first energy source 112 can be different than (and possibly incompatible with) the second operating characteristics of second energy source 114. As shown, first energy source 112 and second energy source 114 are in operable communication and/or electrically connected to electronic control system 108 and to double ended inverter system 116. It should also be noted that vehicle 100, in the depicted embodiment, does not include a direct current-to-direct current (DC/DC) power converter as an integral part of the vehicle's traction propulsion system.

The motor 110, in one embodiment, is a three-phase alternating current (AC) electric traction motor. As shown in FIG. 1, motor 110 may also include or cooperate with a transmission such that motor 110 and the transmission are mechanically coupled to at least some of the wheels 106 through one or more drive shafts 120. The radiator 118 is connected to the frame at an outer portion thereof and although not illustrated in detail, includes multiple cooling channels that contain a cooling fluid (i.e., coolant), such as water and/or ethylene glycol (i.e., antifreeze). The radiator 118 is coupled to double ended inverter system 116 and to motor 110 for purposes of routing the coolant to those components. In one embodiment, double ended inverter system 116 receives and shares coolant with motor 110. In other embodiments, the double ended inverter system 116 may be air cooled.

The electronic control system 108 is in operable communication with motor 110, first energy source 112, second energy source 114, and double ended inverter system 116. Although not shown in detail, electronic control system 108 includes various sensors and automotive control modules, or electronic control units (ECUs), such as an inverter control module (i.e., the controller shown in FIG. 2 and FIG. 3) and a vehicle controller, and at least one processor and/or a memory which includes instructions stored thereon (or in another computer-readable medium) for carrying out the processes and methods as described below.

FIG. 2 is a schematic circuit representation of an embodiment of a double ended inverter system 200 suitable for use with an electric or hybrid electric vehicle. In certain embodiments, double ended inverter system 116 (shown in FIG. 1) can be implemented in this manner. As depicted in FIG. 2, double ended inverter system 200 is coupled to, and cooperates with, an AC electric traction motor 202, a low temperature battery subsystem 204, and a high temperature battery subsystem 206. Double ended inverter system 200 generally includes, without limitation: a first inverter subsystem 208 coupled to low temperature battery subsystem 204; a second inverter subsystem 210 coupled to high temperature battery subsystem 206, and a controller 212 coupled to first inverter subsystem 208 and to second inverter subsystem 210. Although not shown in FIG. 2, respective capacitors may be coupled in parallel with low temperature battery subsystem 204 and high temperature battery subsystem 206 to smooth current ripple during operation.

Double ended inverter system 200 allows AC electric traction motor 202 to be powered by different battery types having disparate nominal operating temperature ranges. This topology enables the vehicle to take advantage of better performance characteristics of different battery types without having to compromise by using a single battery. For this particular embodiment, low temperature battery subsystem 204 is realized as a low temperature battery pack that has a relatively low nominal operating temperature range. In other words, the low temperature battery pack can provide reliable operating power to double ended inverter system 200 under low temperature conditions that might adversely affect the operation of high temperature battery subsystem 206.

In one embodiment, low temperature battery subsystem 204 includes a lead acid battery pack having a nominal operating temperature range of about −40° C. to +95° C., and a nominal DC voltage of about 200-350 volts (typically, about 300 volts). In contrast, high temperature battery subsystem 206 is realized as a high temperature battery pack that has a relatively high nominal operating temperature range. Thus, the high temperature battery pack can provide reliable operating power to double ended inverter system 200 under high temperature conditions that might adversely affect the operation of low temperature battery subsystem 204. In one embodiment, high temperature battery subsystem 206 includes a lithium ion battery pack having a nominal operating temperature range of about −20° C. to +80° C., and a nominal DC voltage of about 200-350 volts (typically, about 300 volts). Notably, a lithium ion battery pack is not appropriate for temperatures below about −20° C. and, therefore, the lead acid battery pack is more suitable for such extremely low temperatures. Although not a requirement, in the preferred embodiment the voltage of the low temperature battery pack is approximately equal to the voltage of the high temperature battery pack.

In certain embodiments, a lithium ion battery pack is located within a cabin of the vehicle (e.g., inside the passenger cabin) such that it can be subjected to cabin heating and/or cooling. Accordingly, even in extremely cold environments, the temperature of the lithium ion battery pack can be brought into its nominal operating temperature range using the onboard heating system of the host vehicle. In addition, operation of double ended inverter system 200 will raise the temperature of the lithium ion battery pack after the vehicle is started in cold environments.

The AC electric traction motor 202, in one embodiment, is a three phase motor that includes a set of three windings (or coils) 214, each corresponding to one phase of AC electric traction motor 202, as is commonly understood. In one embodiment, the neutral point of AC electric traction motor 202 is opened up to make it a six terminal, three phase motor. Although not illustrated, AC electric traction motor 202 includes a stator assembly (including the coils) and a rotor assembly (including a ferromagnetic core), as will be appreciated by one skilled in the art.

For this embodiment, first inverter subsystem 208 and second inverter subsystem 210 each includes six switches (e.g., semiconductor devices, such as transistors) with antiparallel diodes (i.e., the direction of current through the transistor switch is opposite to the direction of allowable current through the respective diode). As shown, the switches in a section 216 of first inverter subsystem 208 are arranged into three pairs (or legs): pairs 218, 220, and 222. Similarly, the switches in a section 224 of second inverter subsystem 210 are arranged into three pairs (or legs): pairs 226, 228, and 230. A first winding in the set of windings 214 is electrically coupled, at opposing ends thereof, between the switches of pair 218 (in section 216) and the switches of pair 226 (in section 224). A second winding in the set of windings 214 is coupled between the switches of pair 220 (in section 216) and the switches of pair 228 (in section 224). A third winding in the set of windings 214 is coupled between the switches of pair 222 (in section 216) and the switches of pair 230 (in section 224). Thus, one end of each winding is coupled to first inverter subsystem 208, and the opposite end of each winding is coupled to second inverter subsystem 210.

First inverter subsystem 208 and second inverter subsystem 210 are configured to drive AC electric traction motor 202, individually or collectively (depending upon the particular operating conditions). In this regard, controller 212 is suitably configured to influence the operation of first inverter subsystem 208 and second inverter subsystem 210 to manage power transfer among low temperature battery subsystem 204, high temperature battery subsystem 206, and AC electric traction motor 202. The controller 212 is responsive to commands received from the driver of the vehicle (e.g., via an accelerator pedal) and provides control signals or commands to section 216 of first inverter subsystem 208 and to section 224 of second inverter subsystem 210 to control the output of sections 216 and 224. High frequency pulse width modulation (PWM) techniques may be employed to control sections 216 and 224 and to manage the voltage produced by sections 216 and 224.

Referring also to FIG. 1, vehicle 100 is operated by providing power to wheels 106 via the AC electric traction motor, which receives its operating energy from low temperature battery subsystem 204 and/or high temperature battery subsystem 206. In order to power the motor, DC power is provided from low temperature battery subsystem 204 and high temperature battery subsystem 206 to first inverter subsystem 208 and second inverter subsystem 210, respectively, which convert the DC power into AC power, as is commonly understood in the art. In certain embodiments, if the motor does not require the maximum power output of low temperature battery subsystem 204, the extra power from low temperature battery subsystem 204 may be used to charge high temperature battery subsystem 206. Similarly, if the motor does not require the maximum power output of high temperature battery subsystem 206, the extra power from high temperature battery subsystem 206 may be used to charge low temperature battery subsystem 204. Of course, under certain operating conditions, controller 212 can be utilized to drive the motor using energy from both energy sources.

In operation, controller 212 receives a torque command for AC electric motor 202, and determines how best to manage the flow of power between low temperature battery subsystem 204 and first inverter subsystem 208, and between high temperature battery subsystem 206 and second inverter subsystem 210. In this manner, controller 212 also regulates the manner in which first inverter subsystem 208 and second inverter subsystem 210 drive AC electric motor 202. Double ended inverter system 200 may utilize any suitable control methodology, protocol, scheme, or technique. For example, certain aspects of the techniques and technologies described in U.S. Pat. Nos. 7,154,237 and 7,199,535 (both assigned to General Motors Corporation) may be employed by double ended inverter system 200. The relevant content of these patents is incorporated by reference herein.

For the embodiment described here, controller 212 is also suitably configured to regulate whether low temperature battery subsystem 204 is the primary energy source, high temperature battery subsystem 206 is the primary energy source, or whether both contribute energy to drive AC electric traction motor 202. For instance, under certain circumstances controller 212 operates to drive AC electric traction motor 202 primarily with low temperature battery subsystem 204 until high temperature battery subsystem 206 reaches its normal operating temperature range. This situation occurs when the temperature of high temperature battery subsystem 206 is below its normal operating range, and when the temperature of low temperature battery subsystem 204 is within its normal operating range. After high temperature battery subsystem 206 reaches its normal operating temperature range (e.g., by heating of the vehicle cabin or by internal operating heat), controller 212 can drive AC electric traction motor 202 primarily with high temperature battery subsystem 206.

In practice, the vehicle may include a battery controller, which may be separate from or integrated with controller 212 (typically, it will be separate). The battery controller is suitably configured to monitor the temperature and state of charge information (along with other information, such as cell balancing). The battery controller can analyze and/or process such information and provide a power capability to the vehicle controller. The vehicle controller processes the information obtained from the battery controller, along with driver commands, to determine how best to meet the driver's request and satisfy any subsystem requests such as power balancing between the two energy sources.

FIG. 3 is a schematic circuit representation of an alternate embodiment of a double ended inverter system 300 suitable for use with an electric or hybrid electric vehicle. In certain embodiments, double ended inverter system 116 (shown in FIG. 1) can be implemented in this manner. As depicted in FIG. 3, double ended inverter system 300 is coupled to, and cooperates with, an AC electric traction motor 302, a power battery subsystem 304, and an energy battery subsystem 306. Double ended inverter system 300 generally includes, without limitation: a first inverter subsystem 308 coupled to power battery subsystem 304; a second inverter subsystem 310 coupled to energy battery subsystem 306, and a controller 312 coupled to first inverter subsystem 308 and to second inverter subsystem 310. Double ended inverter system 300 is similar to double ended inverter system 200 and, for the sake of brevity, common elements, features, and functions will not be redundantly described here in the context of double ended inverter system 300.

Double ended inverter system 300 allows AC electric traction motor 302 to be powered by different battery types having disparate power/energy delivery characteristics. This topology enables the vehicle to take advantage of better performance characteristics of different battery types without having to compromise by using a single battery. For this particular embodiment, power battery subsystem 304 has a relatively high voltage and a relatively low amp-hours rating, while energy battery subsystem 306 has a relatively medium-to-high voltage and a relatively high amp-hours rating. In practice, power battery subsystem 304 is suitably configured to provide energy needed to support short duration peak power events, such as acceleration of the vehicle. Conversely, energy battery subsystem 306 is suitably configured to provide energy needed to sustain continuous and somewhat steady load conditions, such as "cruising" of the vehicle at a somewhat constant speed. Thus, power battery subsystem 304 can support effective operation of AC electric traction motor 302 under some conditions, and energy battery subsystem 306 can support effective operation of AC electric traction motor 302 under other conditions.

In one embodiment, power battery subsystem 304 includes a lead acid or NiMH battery pack having a nominal DC voltage of about 200-350volts (typically, about 300 volts), and having a typical energy rating of about 1-2 kWh. In contrast, energy battery subsystem 306 can be realized as a lithium ion battery pack having a nominal DC voltage of about 200-350 volts (typically, about 300 volts), and having a typical energy rating of about 10-20 kWh. Although not a requirement, in the preferred embodiment the voltage of power battery subsystem 304 is usually higher than the voltage of energy battery subsystem 306. In practice, the voltage of power battery subsystem 304 is typically no greater than twice the voltage of energy battery subsystem 306.

For the embodiment described here, controller 312 is suitably configured to regulate whether power battery subsystem 304 is the primary energy source, energy battery subsystem 306 is the primary energy source, or whether both contribute energy to drive AC electric traction motor 302. For instance, under certain circumstances controller 312 operates to drive AC electric traction motor 302 primarily with energy battery subsystem 306 during continuous loading events associated with operation of the vehicle. Such continuous loading events include, without limitation: operation of the vehicle at a constant speed; operation of the vehicle while stationary; contributing some energy during acceleration; or accepting some energy during braking events. In addition, controller 312 is configured to drive AC electric traction motor 302 primarily with power battery subsystem 304 during short duration peak power events associated with operation of the vehicle. Such short duration peak power events include, without limitation: acceleration of the vehicle; initial startup of the vehicle; braking (during which it may be desirable to use regenerative braking energy to recharge power battery subsystem 304); or a rapid charge event associated with an external charger.

In practice, the vehicle controller would determine how best to operate the vehicle to meet driver requests while maximizing fuel economy. It receives input from other control subsystems on the vehicle. Controller 312 provides some of this information, such as what the motor can provide, based on temperature, speed, and voltage available. The vehicle controller can then process this information in an appropriate manner and then instruct controller 312 as needed. In this manner, the double ended inverter can be controlled to accommodate different modes of operation and, in turn, determine which battery is more appropriate.

The double ended inverter topologies described above can be employed to interface two different energy sources (e.g., batteries) having different and disparate operating characteristics for controlled and managed operation in combination with an AC traction motor of an electric or hybrid electric vehicle. These double ended inverter topologies facilitate the use of existing and available batteries in a manner that takes better advantage of the individual performance capabilities of each battery.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A double ended inverter system for an AC electric traction motor of a vehicle, the system comprising:
   a first energy source having first operating characteristics associated therewith;
   a first inverter subsystem coupled to the first energy source and configured to drive the AC electric traction motor;
   a second energy source having second operating characteristics associated therewith, wherein the first operating characteristics and the second operating characteristics are different;
   a second inverter subsystem coupled to the second energy source and configured to drive the AC electric traction motor; and
   a controller coupled to the first inverter subsystem and to the second inverter subsystem, the controller being configured to influence operation of the first inverter subsystem and the second inverter subsystem to manage power transfer among the first energy source, the second energy source, and the AC electric traction motor, and
   wherein the controller is configured to drive the AC electric traction motor primarily with the first energy source during continuous loading events associated with operation of the vehicle, and primarily with the second energy source during short duration peak power events associated with operation of the vehicle.

2. The double ended inverter system of claim 1, wherein:
   the first energy source comprises a first battery subsystem having a first nominal operating temperature range; and
   the second energy source comprises a second battery subsystem having a second nominal operating temperature range different than the first nominal operating temperature range.

3. The double ended inverter system of claim 2, wherein:
   the first battery subsystem comprises a lead acid battery pack; and
   the second battery subsystem comprises a lithium ion battery pack.

4. The double ended inverter system of claim 2, wherein the controller is configured to drive the AC electric traction motor primarily with the first battery subsystem until the second battery subsystem reaches its normal operating temperature range.

5. The double ended inverter system of claim 4, wherein the controller is configured to drive the AC electric traction motor primarily with the second battery subsystem after the second battery subsystem reaches its normal operating temperature range.

6. The double ended inverter system of claim 2, wherein the second battery subsystem is located within a cabin of the vehicle such that the second battery subsystem is subjected to cabin heating/cooling.

7. The double ended inverter system of claim 1, wherein the first operating characteristics include first energy charge/discharge characteristics, and wherein the second operating characteristics include second energy charge/discharge characteristics that are different and more efficient than the first energy charge/discharge characteristics during short duration peak power events associated with operation of the vehicle in contrast to continuous loading events associated with operation of the vehicle.

8. The double ended inverter system of claim 1, wherein:
   the first energy source comprises a power battery subsystem having a relatively high voltage and a relatively low amp-hours rating; and
   the second energy source comprises an energy battery subsystem having a relatively low voltage and a relatively high amp-hours rating greater than the relatively low amp-hours rating.

9. The double ended inverter system of claim 8, wherein:
   the power battery subsystem comprises a lead acid battery pack; and
   the energy battery subsystem comprises a lithium ion battery pack.

10. The double ended inverter system of claim 8, wherein:
    the power battery subsystem comprises a nickel metal hydride battery pack; and the energy battery subsystem comprises a lithium ion battery pack.

11. A double ended inverter system for a vehicle, the system comprising:
- an AC electric traction motor comprising a set of windings, where each winding in the set of windings has a first end and a second end;
- a first energy source having a first nominal operating temperature range;
- a first inverter subsystem coupled to the first energy source and configured to drive the AC electric traction motor, wherein the first end of each winding in the set of windings is coupled to the first inverter subsystem;
- a second energy source having a second nominal operating temperature range different than the first nominal operating temperature range; and
- a second inverter subsystem coupled to the second energy source and configured to drive the AC electric traction motor, wherein the second end of each winding in the set of windings is coupled to the second inverter subsystem; and
- a controller, coupled to the first inverter subsystem and to the second inverter subsystem, and being configured to drive the AC electric traction motor primarily with the first energy source until the second energy source reaches its normal operating temperature range, and primarily with the second energy source after the second energy source reaches its normal operating temperature range.

12. The double ended inverter system of claim 11, wherein the AC electric traction motor comprises a three phase motor.

13. The double ended inverter system of claim 11, the controller being configured to influence operation of the first inverter subsystem and the second inverter subsystem to manage power transfer among the first energy source, the second energy source, and the AC electric traction motor.

14. The double ended inverter system of claim 11, wherein the first energy source has first energy charge/discharge characteristics, and wherein the second energy source has second energy charge/discharge characteristics that are different and more efficient than the first energy charge/discharge characteristics during short duration peak power events associated with operation of the vehicle in contrast to continuous loading events associated with operation of the vehicle.

15. A double ended inverter system for a vehicle, the system comprising:
- an AC electric traction motor comprising a set of windings, where each winding in the set of windings has a first end and a second end;
- a power battery subsystem having a relatively high voltage and a relatively low amp-hours rating;
- a first inverter subsystem coupled to the power battery subsystem and configured to drive the AC electric traction motor, wherein the first end of each winding in the set of windings is coupled to the first inverter subsystem;
- an energy battery subsystem having a relatively medium-to-high voltage and a relatively high amp-hours rating greater than the relatively low amp-hours rating; and
- a second inverter subsystem coupled to the energy battery subsystem and configured to drive the AC electric traction motor, wherein the second end of each winding in the set of windings is coupled to the second inverter subsystem; and
- wherein the controller is configured to drive the AC electric traction motor primarily with the energy battery subsystem during continuous loading events associated with operation of the vehicle, and is configured to drive the AC electric traction motor primarily with the power battery subsystem during short duration peak power events associated with operation of the vehicle.

16. The double ended inverter system of claim 15, wherein the AC electric traction motor comprises a three phase motor.

17. The double ended inverter system of claim 15, wherein the energy battery subsystem has first energy charge/discharge characteristics, and wherein the power battery subsystem has second energy charge/discharge characteristics that are different and more efficient than the first energy charge/discharge characteristics during short duration peak power events associated with operation of the vehicle in contrast to continuous loading events associated with operation of the vehicle.

* * * * *